(12) United States Patent
Floyd

(10) Patent No.: US 7,595,683 B1
(45) Date of Patent: Sep. 29, 2009

(54) LOW-INPUT-VOLTAGE CHARGE PUMP

(75) Inventor: Brian H. Floyd, Sunnyvale, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 0 days.

(21) Appl. No.: 11/985,457

(22) Filed: Nov. 15, 2007

(51) Int. Cl.
*G05F 1/10* (2006.01)
(52) U.S. Cl. .................................................... 327/536
(58) Field of Classification Search ......... 327/535–538, 327/540, 541, 543
See application file for complete search history.

(56) References Cited

U.S. PATENT DOCUMENTS

| | | | |
|---|---|---|---|
| 5,874,850 A | 2/1999 | Pulvirenti et al. | |
| 6,107,864 A * | 8/2000 | Fukushima et al. | 327/536 |
| 6,429,723 B1 * | 8/2002 | Hastings | 327/536 |
| 6,483,728 B1 * | 11/2002 | Johnson et al. | 363/60 |
| 6,995,602 B2 | 2/2006 | Pelliconi | |
| 7,145,382 B2 * | 12/2006 | Ker et al. | 327/536 |
| 7,208,996 B2 * | 4/2007 | Suzuki et al. | 327/536 |

* cited by examiner

*Primary Examiner*—Lincoln Donovan
*Assistant Examiner*—Hai L Nguyen
(74) *Attorney, Agent, or Firm*—Sidley Austin LLP

(57) ABSTRACT

In one embodiment, a charge pump system includes an input terminal at which an input voltage is received, and an output terminal at which at an output voltage is provided. N stages are connected in cascade between the input terminal and the output terminal. Each of the N stages includes at most one inverter circuit, the inverter circuit having a first transistor connected at a node to a second transistor. A first capacitor is coupled at one end to the node between the first and second transistors, and is coupled at another end to receive one of two non-overlapping phase signals. In each stage, at one value for the one of two non-overlapping phase signals, the first capacitor of the stage is charged by a respective stage input voltage, and at another value for the one of two non-overlapping phase signals the first capacitor of the stage is discharged to provide a respective stage output voltage. The charge pump system is capable of generating the output voltage with a greater magnitude than the input voltage even when the supply voltage is relatively low, e.g., below 1V.

12 Claims, 2 Drawing Sheets

LOW-INPUT-VOLTAGE CHARGE PUMP

BACKGROUND

1. Field of Invention

The present invention relates to charge pumps, and more particularly, to a low-supply-voltage charge pump.

2. Description of Related Art

Charge pumps are used to generate a higher or greater magnitude voltage from a lower or lesser magnitude voltage. Charge pumps can be used, for example, in power converters, which are essential for many modern electronic devices. Power converters are typically implemented using one or more switching devices, such as transistors, which are turned on and off (or driven) to deliver power to the output of the converter.

For some power converters, there is a need to drive the switching devices even when the input supply (gate) voltage is close to threshold voltage of the switching devices. If the supply voltage is particularly low (e.g., 1V), charge pumps according to previous designs either fail to provide the requisite driving voltage due to pump-stage switch losses or alternately require complex structure.

Moreover, in many applications the output voltage of a charge pump may be regulated to a fixed voltage; thus, the voltage across each pump stage is reduced (regulated) to a voltage less than the open-loop or unregulated value. As such, regulation reduces the individual pump-stage voltage available for gate drive.

SUMMARY

In one embodiment of the present invention, a charge pump of relatively simple design is provided which can generate sufficient drive voltage for a power switching device from a low-supply-voltage (e.g., 1V).

According to an embodiment of the present invention, a charge pump system includes an input terminal at which an input voltage is received, and an output terminal at which at an output voltage is provided. N stages are connected in cascade between the input terminal and the output terminal. Each of the N stages includes at most one inverter circuit, the inverter circuit having a first transistor connected at a node to a second transistor. A first capacitor is coupled at one end to the node between the first and second transistors, and is coupled at another end to receive one of two non-overlapping phase signals. In each stage, at one value for the one of two non-overlapping phase signals, the first capacitor of the stage is charged by a respective stage input voltage, and at another value for the one of two non-overlapping phase signals the first capacitor of the stage is discharged to provide a respective stage output voltage. The charge pump system is capable of generating the output voltage with a greater magnitude than the input voltage even when the supply voltage is relatively low, e.g., below 1V.

Important technical advantages of the present invention are readily apparent to one skilled in the art from the following figures, descriptions, and claims.

BRIEF DESCRIPTION OF DRAWINGS

For a more complete understanding of the present invention and for further features and advantages, reference is now made to the following description taken in conjunction with the accompanying drawings.

DETAILED DESCRIPTION

Figure 1:
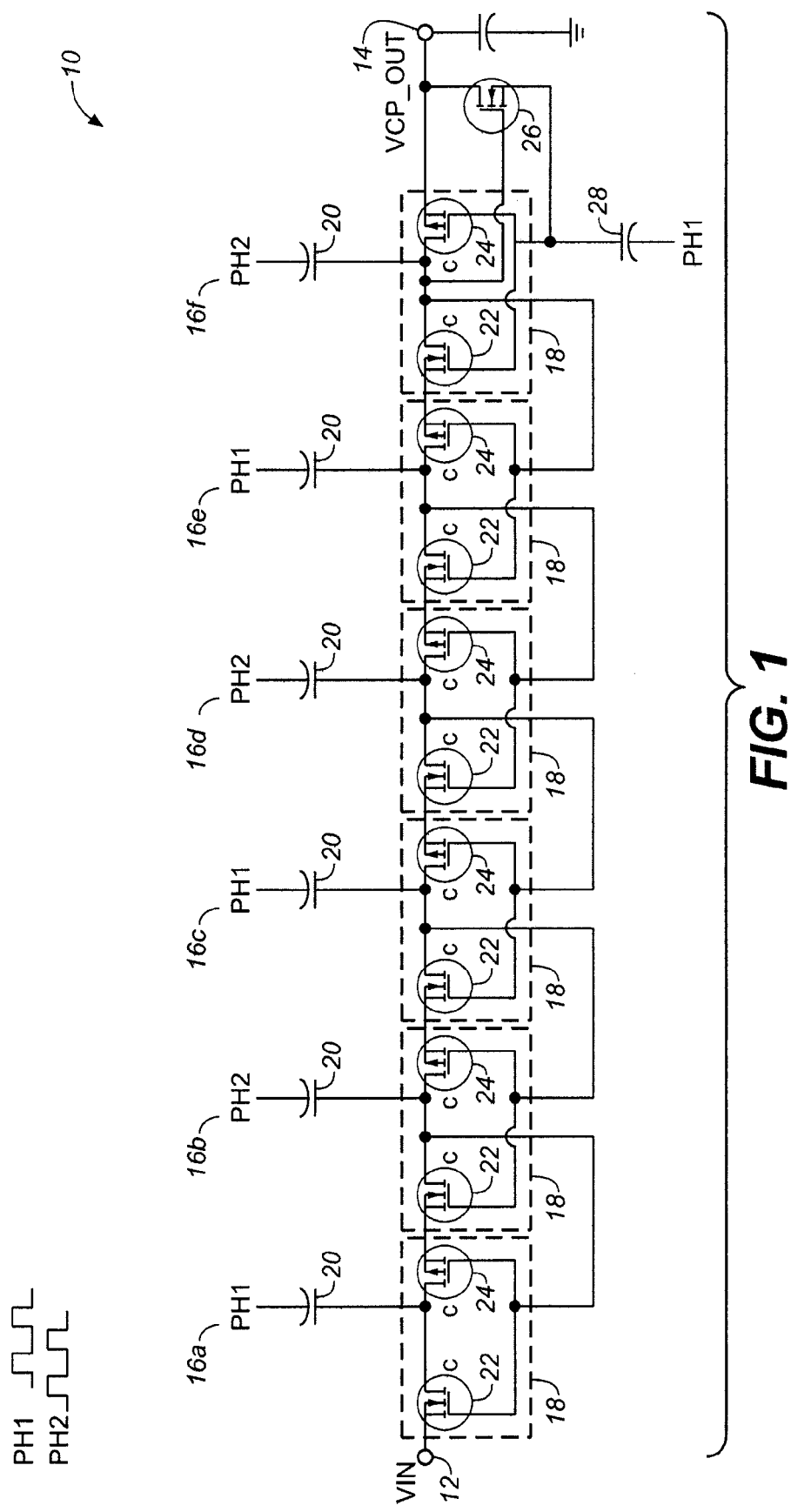
FIG. 1 is a block diagram of one implementation of a low-supply-voltage charge pump system, according to an embodiment of the invention.
Figure 2:
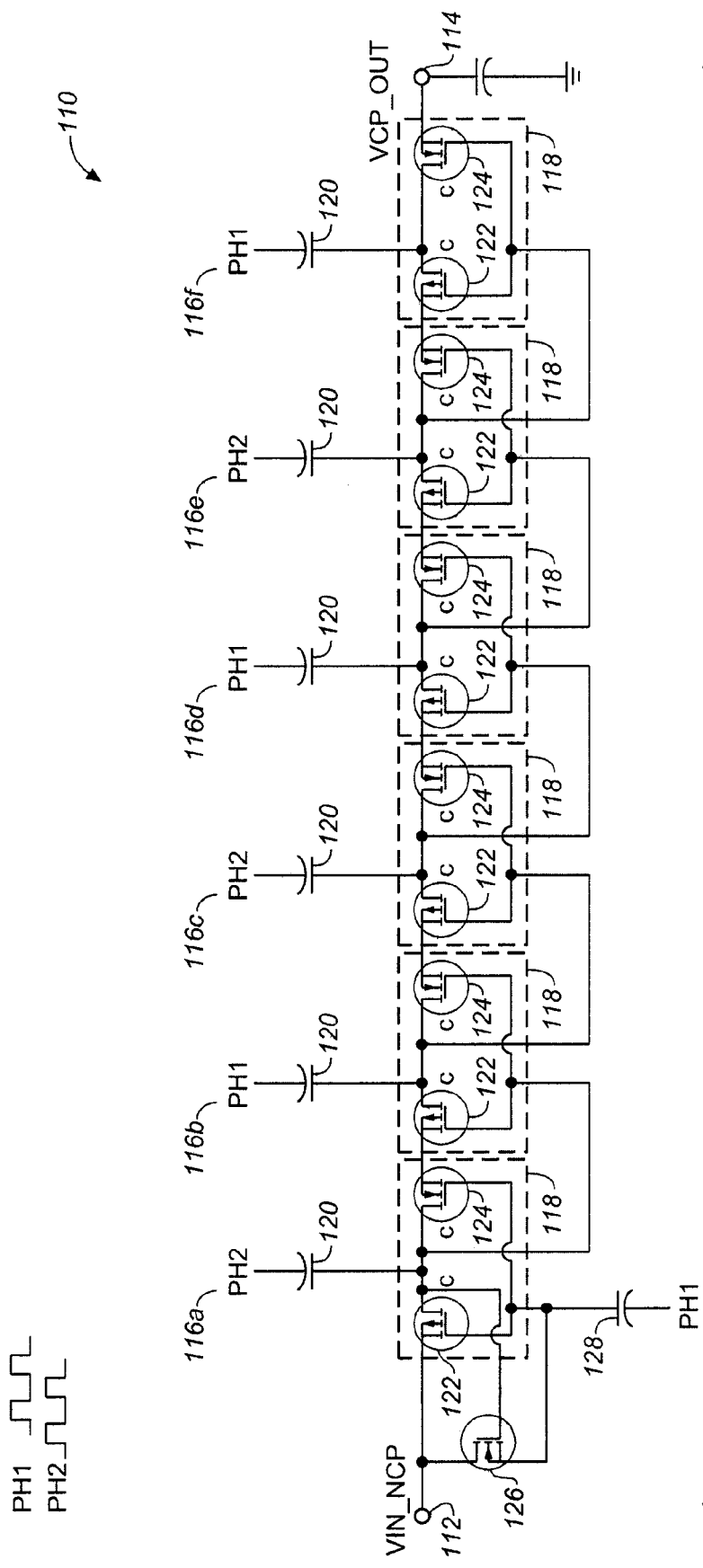
FIG. 2 is a block diagram of another implementation low-supply-voltage charge pump system, according to an embodiment of the invention.

Embodiments of the present invention and their advantages are best understood by referring to FIGS. 1 and 2 of the drawings. Like numerals are used for like and corresponding parts of the various drawings.

In one embodiment of the present invention, a charge pump is provided which fundamentally generates a large voltage from a small voltage. The charge pump will pump to higher voltages even when the supply voltage is relatively low (e.g., 1V). In contrast to previously developed charge pumps capable of generating large voltages from small supply voltages, the charge pump according to some embodiments of the invention is made up of cells or stages which are simpler in design. For example, in one embodiment, each stage of the charge pump can be implemented with only one inverter, unlike the previously developed charge pumps which require at least two inverters for each stage. Thus, the charge pump according to embodiments of the present invention requires less circuitry to implement per pump stage compared to previous designs.

Moreover, embodiments of the present invention offer technical advantages in a regulated charge pump where each stage or cell sustains a fraction of the output voltage. Because the output voltage is limited (or regulated), each cell voltage is also limited. Hence, the available pump gate drive is limited. With embodiments of the present invention, the gate drive available in each stage is augmented, compared to that of the prior art, by using the voltage derived from a successive stage. This provides for better performance in the charge pump according to embodiments of the invention.

Charge pumps according to some embodiments of the present invention can be used in power converter applications, such as, for example, to provide driving gate voltages (e.g., regulated to a maximum Vgs of 6V) for power switches (e.g., power MOSFETs).

Charge pumps according to various embodiments can be designed to pump charge for both positive and negative output voltages.

FIG. 1 is a block diagram of one implementation of a low-supply-voltage charge pump system 10, according to an embodiment of the invention. Charge pump system 10 is a positive charge pump. It receives an input voltage (VIN) at an input terminal 12, and delivers an output voltage (VCP_OUT) of greater magnitude at an output terminal 14. Charge pump system 10 is capable of operating even when the supply, which determines the magnitude of PH1 and PH2 signals, is a relatively small amount (e.g., less than 1V). Charge pump system 10 receives an input voltage VIN which is typically equal to the supply voltage; however, VIN does not have to be equal to the supply voltage. Charge pump system 10 receives control or phase signals PH1 and PH2. Phase signals PH1 and PH2 are non-overlapping clock signals which typically are symmetric square waves with maximum amplitude equal to the supply voltage and minimum amplitude equal to ground (0V).

Charge pump system 10 has multiple or "N" number of stages 16 coupled between input terminal 12 and output terminal 14. As used herein, the terms "coupled" or "connected," or any variant thereof, covers any coupling or connection, either direct or indirect, between two or more elements. As depicted, there are six stages (i.e., N=6), which are individually referenced as stages 16a, 16b, 16c, 16d, 16e, and 16f. Each stage 16a-16f functions to generate an output voltage with magnitude greater than its respective input voltage. The stages 16a-16f are connected in cascade, with the output of one stage being provided as the input to the next stage. The charge pumping stages 16a-16f can also be referenced by their respective positions in the cascade. Stage 16a is the first stage; stage 16b is the second stage; stage 16c is the third stage; stage 16d is the fourth stage; stage 16e is the fifth stage; and stage 16f is the sixth stage. The stages 16a-16f can be viewed as two groups: odd-numbered stages 16a, 16c, and 16e (or the first, third, and fifth stages); and even-numbered stages 16b, 16d, and 16f (or the second, fourth, and sixth stages). Each of the odd-numbered stages (first stage 16a, third stage 16c, and so forth) receives phase signal PH1, while each of the even-numbered stages (second stage 16b, fourth stage 16d, and so forth) receives phase signal PH2.

In one embodiment, the first charge pump stage 16a through the (N−1)th charge pump stage 16e can each be implemented in the same way. As shown, the first through (N−1)th stage—i.e., stages 16a-16e—are each implemented with an inverter 18 and a capacitor 20. Each capacitor 20 stores or releases charge. Each inverter 18 includes transistors (e.g., MOSFETs) 22 and 24. In this embodiment, transistor 22 is an N-channel MOSFET, and transistor 24 is a P-channel MOSFET. The transistors 22 and 24 in each stage 16a-16e are turned on and off by control signals which are provided from the immediately following stage. When a transistor is turned on it conducts current in a manner to allow the transfer of charge. When a transistor is turned off, it blocks current in a manner to prevent the loss of charge. One end of the capacitor 20 of each stage 16a-16e is coupled to the junction of the transistors 22 and 24, and the other end of the capacitor is coupled to receive the phase signal (PH1 or PH2) for the respective stage. Each stage 16a-16e receives its input voltage at transistor 22 and provides its output voltage at transistor 24. For the second through (N−1)th stages—i.e., stages 16b-16e—a control signal is provided from the junction at which capacitor 20 and transistors 22 and 24 are coupled. For each stage 16a-16e, when transistor 22 is turned on (and transistor 24 is turned off), the capacitor 20 is charged by the input to the stage through transistor 22. Alternately, when transistor 24 is turned on (and transistor 22 is turned off), the voltage (or equivalently the charge) on capacitor 20 is delivered out to the next stage through transistor 24.

The last or Nth stage 16f of charge pump system 10 can be implemented in a different way from the first through (N−1)th stages. As shown, the Nth stage 16f is implemented with an inverter 18 and a capacitor 20, similar to the first through (N−1)th stages 16a-16e. The inverter 18 and capacitor 20 of the Nth stage 16f are coupled in the same arrangement and operate in the same manner as inverters 18 and capacitors 20 of the other stages 16a-16e in the charge pump system 10. In addition, Nth stage 16f includes another transistor 26 (e.g., MOSFET) and another capacitor 28. Transistor 26 and capacitor 28 provide the control signal for the inverter 18 of the Nth stage. Transistor 26 combined with pump capacitor 28 provide a final terminating stage for the charge pump system 10. When phase signal PH1 is low, transistor 26 allows charge from VCP_OUT to flow to capacitor 28. When phase signal PH1 transitions high, the charge (voltage) on capacitor 28 provides the requisite drive voltage at the Nth stage inverter 18.

In operation, on application of the phase signals PH1 and PH2, the stages 16a through 16f of charge pump system 10 generate increasingly higher voltage values in the cascade. That is, the first charge pump stage 16a generates a first output voltage which is greater in magnitude than VIN; the second charge pump stage 16b generates a second output voltage which is greater in magnitude than the first output voltage from the first stage 16a; the third stage 16c generates a third output voltage which is greater in magnitude than the second output voltage from the second stage 16b; and so forth. The last or Nth stage 16f in charge pump system 10 generates the output voltage VCP_OUT.

More specifically, in steady-state operation, for the first stage 16a, when phase signal PH2 is high (and phase signal PH1 is low), the control signal from second stage 16b turns transistor 22 on in the first stage 16a, thus allowing the input voltage VIN to charge its capacitor 20. The magnitude of the supply voltage VIN can be relatively small (e.g., less than 1.0V). Transistor 24 is turned off by the control signal. When phase signal PH1 next goes high (and phase signal PH2 goes low), the control signal turns transistor 22 off and turns transistor 24 on in the first stage 16a. This allows capacitor 20 to discharge, and the sum of the voltage on capacitor 20 and the magnitude of the phase signal PH1 is delivered through transistor 24 to the second stage 16b. In some embodiments, the input voltage VIN may have a value equal to the peak (high) magnitude of the phase signals PH1 and PH2. This value could typically be equal to the supply voltage. In other embodiments it may be possible to reach a steady-state condition where transistor 22 of the very first input stage does not completely turn off. This would only occur in the first stage and would not pose a disadvantage to the overall pumping operation.

At the second stage 16b, while the phase signal PH1 is still high (and phase signal PH2 is still low), the control signal from third stage 16c turns transistor 22 on in the second stage 16b, thus allowing the output voltage from the first stage 16a (which has a magnitude equal to the voltage on the capacitor 20 of the first stage 16a and the magnitude of the phase signal PH1) to charge the capacitor 20 of the second stage 16b. Capacitor 20 of the second stage 16b charges to the higher voltage output from the first stage 16a. Transistor 22 of the second stage 16b is turned off by the control signal. When phase signal PH2 goes high (and phase signal PH1 goes low), the control signal turns transistor 22 off and turns transistor 24 on in the second stage 16b. This allows capacitor 20 to discharge, and the sum of the voltage on capacitor 20 in the second stage 16b and the magnitude of the phase signal PH2 are passed through transistor 24 to the third stage 16c. Because the capacitor 20 in the second stage 16b is charged to a greater magnitude than that to which the capacitor 20 in the first stage 16a is charged, a higher voltage is output from the second stage 16b than from the first stage 16a.

Next, for the third stage 16c, while phase signal PH2 is high (and phase signal PH1 is low), the control signal from fourth stage 16d turns transistor 22 on in the third stage 16b, thus allowing the output voltage from the second stage 16b (which has a magnitude equal to the voltage on the capacitor 20 of the first stage 16a and the magnitude of the phase signal PH2) to charge the capacitor 20 of the third stage 16c. Capacitor 20 of the third stage 16c charges to the higher output voltage of the second stage 16b. Transistor 22 of the second stage 16b is turned off by the control signal. When phase signal PH1 next goes high (and phase signal PH2 goes low), the control signal turns transistor 22 off and turns transistor 24 on in the third stage 16c. This allows capacitor 20 of the third stage 16c to discharge, and the sum of the voltage on capacitor 20 in the third stage 16c and the magnitude of the phase signal PH1 are passed through transistor 24 to the fourth stage 16d. Because the capacitor 20 in the third stage 16c is charged to an even greater magnitude than that to which the capacitor 20 in the second stage 16c is charged, an even higher voltage is output from the third stage 16c than from the second stage 16b.

This continues for all of the remaining stages up the (N−1)th stage.

At the last or Nth stage 16f of the charge pump system 10, when the phase signal PH1 is high (and phase signal PH2 is low), transistor 26 is turned off, and the control signal (from capacitor 28) turns transistor 22 on in the Nth stage 16f, thus allowing the output voltage from the (N−1)th stage 16e to charge the capacitor 20 of the Nth stage 16f. Capacitor 20 of the Nth stage 16f charges to a higher voltage than any other stage in system 10. Transistor 22 of the Nth stage 16f is turned off by the control signal. When phase signal PH2 goes high (and phase signal PH1 goes low), transistor 26 is turned on, and the control signal turns transistor 22 off and turns transistor 24 on in the Nth stage 16f. This allows capacitor 20 to discharge, and the sum of the voltage on capacitor 20 in the Nth stage 16f and the magnitude of the phase signal PH2 are passed through transistor 24 as the output voltage VCP_OUT of the charge pump system. This output voltage also charges capacitor 28.

Thus, when phase signal PH1 is high (and phase signal PH2 is low), each of the odd-numbered stages 16a, 16b, and 16c outputs a voltage which charges the capacitor 20 in the respective following even-numbered stages (stages 2, 4, 6, etc., or blocks 18, 22, 26, 30). Alternately, when phase signal PH2 is high (and phase signal PH1 is low), each of the even-numbered stages (stages 2, 4, 6, etc., or blocks 18, 22, 26, 30) outputs a voltage which charges the capacitor 20 in the respective following odd-numbered stages (stages 3, 5, etc., or blocks 20, 24, 28, 30). In other words, charge is transferred from left to right in charge pump system 10 in this manner (from VIN to VCP_OUT).

In some embodiments, the output voltage of the charge pump system 10 can be regulated, for example, to a particular voltage value. In other embodiments, the output voltage of the charge pump system 10 can be unregulated.

FIG. 2 is a block diagram of another implementation of a low-input-voltage charge pump system 110, according to an embodiment of the invention. Charge pump system 110 is a negative charge pump. It receives an input voltage (VIN_NCP) at an input terminal 112, and delivers a negative output voltage (VCP_OUT) of greater magnitude at an output terminal 114. Charge pump system 110 is capable of operating even when the supply voltage is relatively small (e.g., less than 1.0V). Charge pump system 110 receives control or phase signals PH1 and PH2. Phase signals PH1 and PH2 are non-overlapping clock signals with (peak) magnitude typically equal to the supply voltage. The input voltage (VIN_NCP) is typically ground (0V).

Similar to the positive charge pump system 10 shown in FIG. 1, negative charge pump system 110 of FIG. 2 has multiple or "N" number of stages 116 coupled between input terminal 112 and output terminal 114. As depicted, there are six stages (i.e., N=6), which are individually referenced as stages 116a, 116b, 116c, 116d, 116e, and 116f. Each stage 116a-116f functions to generate an output voltage with an absolute magnitude greater than its respective input voltage. The stages 116a-116f are connected in cascade, with the output of one stage being provided as the input to the next stage. The charge pumping stages 116a-116f can also be referenced by their respective positions in the cascade. Stage 116a is the first stage; stage 116b is the second stage; stage 116c is the third stage; stage 116d is the fourth stage; stage 116e is the fifth stage; and stage 116f is the sixth stage. The stages 116a-116f can be viewed as two groups: odd-numbered stages 116a, 116c, and 116e (or the first, third, and fifth stages); and even-numbered stages 116b, 116d, and 116f (or the second, fourth, and sixth stages). Each of the odd-numbered stages (first stage 116a, third stage 116c, and so forth) receives phase signal PH2, while each of the even-numbered stages (second stage 116b, fourth stage 116d, and so forth) receives phase signal PH1.

In one embodiment, the second charge pump stage 116b through the Nth charge pump stage 116f can each be implemented in the same way. As shown, the second through Nth stage—i.e., stages 116b-116f—are each implemented with an inverter 118 and a capacitor 120. Each capacitor 120 stores or releases charge. Each inverter 118 includes transistors (e.g., MOSFETs) 122 and 124. In this embodiment, transistor 122 is a P-channel MOSFET, and transistor 124 is an N-channel MOSFET. The transistors 122 and 124 in each stage 116b-116f are turned on and off by control signals which are provided from the immediately preceding stage. One end of the capacitor 120 of each stage 116b-116f is coupled to the junction of the transistors 122 and 124, and the other end of the capacitor is coupled to receive the phase signal (PH1 or PH2) for the respective stage. In contrast to the operation of positive charge pump of FIG. 1, here each stage 116b-116f transfer charge from right to left (from VCP_OUT to VIN_NCP); thus, a lower voltage is always transferred from left to right (from VIN_NCP to VCP_OUT). Stated differently, if transistor 124 is considered the stage output and transistor 122 is considered the stage input, negative voltage is transferred from stage input to stage output. For the second through (N−1)th stages—i.e., stages 16b-16f—a control signal is provided from the junction at which capacitor 120 and transistors 122 and 124 are coupled. For each stage 116b-116f, when transistor 124 is turned on (and transistor 122 is turned off), the capacitor 120 is charged through transistor 124. Alternately, when transistor 124 is turned off (and transistor 122 is turned on), the charge on capacitor 120 is transferred to the left to the preceding stage through transistor 122. This is equivalent to transferring a negative voltage from left to right.

The first 116a of charge pump system 110 can be implemented in a different way from the second through Nth stages. As shown, the first stage 116a is implemented with an inverter 118 and a capacitor 120, similar to the second through Nth stages 16b-16f. The inverter 118 and capacitor 120 of the first stage 116a are coupled in the same arrangement and operate in the same manner as inverters 118 and capacitors 120 of the other stages 116b-116f in the charge pump system 110. In addition, first stage 116a includes another transistor 126 (e.g., MOSFET) and another capacitor 128. Transistor 126 and capacitor 128 provide the control signal for the inverter 118 of the first stage. When transistor 126 is turned on (phase signal PH1 low), charge is transferred through transistor 126 to capacitor 128. When phase signal PH1 is high, transistor 126 is turned off and the charge on capacitor 128 provides the gate drive for inverter 118 of the first stage.

The negative charge pump system 110 of FIG. 2 is like a mirror image of the positive charge pump system 10 of FIG. 1; VIN_NCP is fixed and VCP_OUT will pump down to a lower (or negative) potential as charge is transferred from right to left (from VCP_OUT to VIN_NCP). In operation of negative charge pump system 110, on application of the phase signals PH1 and PH2, the stages 116a through 116f of charge pump system 110 generate increasingly higher absolute voltage values in the cascade. That is, the first charge pump stage 16a generates a first (negative) output voltage which is greater in absolute magnitude than VIN_NCP; the second charge pump stage 116b generates a second (negative) output voltage which is greater in absolute magnitude than the first output voltage from the first stage 116a; the third stage 116c generates a third (negative) output voltage which is greater in absolute magnitude than the second output voltage from the second stage 116b; and so forth. The last or Nth stage 116f in charge pump system 110 generates the output voltage VCP_OUT, which is less than VIN_NCP. Typically, because VIN_NCP is set to be ground (0V), the charge pump output VCP_OUT will be negative.

In one application, charge pump system 10 or 110 can be used in a power converter system, for example, to drive a power switching device (e.g., power MOSFET). The output voltage VCP_OUT is applied to the control terminal (e.g., gate) of the power switching device to assure good conduction of the switching device. In another application, charge pump system 10 or 110 can be used in a flash memory to provide higher voltage levels.

In some embodiments, all or a portion of charge pump system 10 or 110 can be implemented as discrete components, or on a single or multiple semiconductor dies (commonly referred to as a "chip") either alone or along with other circuitry, such as, for example, flash memory. Each die is a monolithic structure formed from, for example, silicon or other suitable material. For implementations using multiple dies or components, the dies and components can be assembled on a printed circuit board (PCB) having various traces for conveying signals there between.

A technical advantage of charge pump systems 10 and 110 is that each stage 16a-16f (or 116a-116f) is implemented with only a single inverter, as compared to prior designs for charge pumps capable of working on relatively low input (supply) voltage, such as 1V or slightly lower. In particular, with such prior designs, at least two inverters (or four transistors) are required to implement each stage. Accordingly, charge pump systems 10 and 110 are simpler and require less physical space to implement.

Another technical advantage of charge pump systems 10 and 110 is that the inverter 18 (or 118) in each of the N stages 16a-16f (or 116a-116f) is driven with a control signal having a greater magnitude than that of previous designs. This provides better performance at each stage 16a-16f (or 116a-116f) and thus better overall performance for charge pump system 10.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A charge pump system comprising:
   an input terminal at which an input voltage is received;
   an output terminal at which at an output voltage is provided;
   N stages connected in cascade between the input terminal and the output terminal,
   wherein each of the N stages comprises:
      at most one inverter circuit, the inverter circuit having a first transistor connected at a node to a second transistor;
      a first capacitor coupled at one end to the node between the first and second transistors, the first capacitor coupled at another end to receive one of two non-overlapping phase signals; and
      wherein at one value for the one of two non-overlapping phase signals the first capacitor of the stage is charged by a respective stage input voltage, and wherein at another value for the one of two non-overlapping phase signals the first capacitor of the stage is discharged to provide a respective stage output voltage; and
   wherein the charge pump system generating the output voltage with a greater magnitude than the input voltage even when the supply voltage is below 1V;
   wherein each of the first through the (N−1)th stages receives a control signal from a subsequent stage in the charge pump system.

2. The charge pump system of claim 1 wherein the system is a positive charge pump system.

3. The charge pump system of claim 1 wherein the output voltage is regulated.

4. The charge pump system of claim 1 wherein the output voltage is unregulated.

5. The charge pump system of claim 1 wherein progressively larger stage output voltages are provided from each of the first through the (N−1)th stages to the next respective stage in the charge pump system.

6. The charge pump system of claim 1 wherein one of the first and the last of the N stages includes a third transistor and second capacitor.

7. The charge pump system of claim 6 wherein at one value for the one of two non-overlapping phase signals a voltage on the second capacitor and a voltage of one of two non-overlapping phase signals is provided through the third transistor as the output voltage of the charge pump system.

8. A charge pump system comprising:
   an input terminal at which an input voltage is received;
   an output terminal at which at an output voltage is provided;
   N stages connected in cascade between the input terminal and the output terminal,
   wherein each of the N stages comprises:
      at most one inverter circuit, the inverter circuit having a first transistor connected at a node to a second transistor;
      a first capacitor coupled at one end to the node between the first and second transistors, the first capacitor coupled at another end to receive one of two non-overlapping phase signals; and
      wherein at one value for the one of two non-overlapping phase signals the first capacitor of the stage is charged by a respective stage input voltage, and wherein at another value for the one of two non-overlapping phase signals the first capacitor of the stage is discharged to provide a respective stage output voltage; and
   wherein the charge pump system generating the output voltage with a greater magnitude than the input voltage even when the supply voltage is below 1V;
   wherein each of the second through the N-th stages receives a control signal from a preceding stage in the charge pump system.

9. A positive charge pump system comprising:
an input terminal at which an input voltage is received;
an output terminal at which at an output voltage is provided;
first through Nth stages connected in cascade between the input terminal and the output terminal,
wherein each of the first through Nth stages comprises:
- at most one inverter circuit, the inverter circuit having a first transistor connected at a node to a second transistor;
- a first capacitor coupled at one end to the node between the first and second transistors, the first capacitor coupled at another end to receive one of two non-overlapping phase signals; and
- wherein at one value for the one of two non-overlapping phase signals the first capacitor of the stage is charged by a respective stage input voltage, and wherein at another value for the one of two non-overlapping phase signals the first capacitor of the stage is discharged to provide a respective stage output voltage; and wherein the Nth stage comprises a third transistor and second capacitor, wherein at one value for the one of two non-overlapping phase signals a voltage on the second capacitor and a voltage of one of two non-overlapping phase signals is provided through the third transistor as the output voltage of the charge pump systems wherein the output voltage of the charge pump system has a greater magnitude than the input voltage even when the supply voltage is relatively low;

wherein each of the first through the (N−1)th stages receives a control signal from a subsequent stage in the charge pump system.

10. The charge pump system of claim 9 wherein the output voltage is regulated.

11. The charge pump system of claim 9 wherein the output voltage is unregulated.

12. The charge pump system of claim 9 wherein supply voltage can be below 1V.

* * * * *